(12) United States Patent
Boulos et al.

(10) Patent No.: US 6,548,468 B1
(45) Date of Patent: Apr. 15, 2003

(54) SOLVENT-FREE OR SOLVENT-MINIMIZED PROCESS AND COMPOSITION FOR CLEANING HARD SURFACES, ESPECIALLY FOR REMOVING LONG-DRIED PAINT AND CARBONACEOUS SOILS FROM ALUMINUM ENGINE PARTS

(75) Inventors: Mervet S. Boulos, Troy; Craig S. Caldwell, Rochester Hills, both of MI (US)

(73) Assignee: Henkel Corporation, Gulph Mills, PA (US)

(*) Notice: Subject to any disclaimer, the term of this patent is extended or adjusted under 35 U.S.C. 154(b) by 26 days.

(21) Appl. No.: 09/706,386

(22) Filed: Nov. 3, 2000

Related U.S. Application Data

(60) Provisional application No. 60/163,664, filed on Nov. 5, 1999.

(51) Int. Cl.[7] .............................. C11D 1/68; C11D 3/02; C11D 3/06; C11D 3/08
(52) U.S. Cl. .................. 510/362; 510/417; 510/506; 510/434; 510/505; 510/422; 510/365; 510/421; 510/432; 510/405; 510/510; 510/475; 510/512; 134/2; 134/40; 134/41
(58) Field of Search .................... 510/362, 417, 510/506, 434, 505, 422, 365, 421, 432, 405, 510, 475, 512; 134/2, 40, 41

(56) References Cited

U.S. PATENT DOCUMENTS

| | | | |
|---|---|---|---|
| 4,457,322 A | 7/1984 | Rubin et al. | 134/2 |
| 4,539,134 A | 9/1985 | Martin et al. | 252/156 |
| 5,391,234 A | 2/1995 | Murphy | 134/38 |
| 5,545,347 A | 8/1996 | Ouyang et al. | 510/254 |
| 5,634,979 A | 6/1997 | Carlson et al. | 134/3 |
| 5,736,495 A * | 4/1998 | Bolkan et al. | |
| 6,140,291 A * | 10/2000 | Bolkan et al. | |
| 6,156,716 A * | 12/2000 | Ahmed | |
| 6,211,132 B1 | 4/2001 | Pierce et al. | 510/365 |
| 6,251,847 B1 | 6/2001 | Pierce et al. | 510/365 |

* cited by examiner

Primary Examiner—Yogendra N. Gupta
Assistant Examiner—Gregory E. Webb
(74) Attorney, Agent, or Firm—Stephen D. Harper; Mary K. Cameron

(57) ABSTRACT

An aqueous based cleaner containing at least inorganic alkalinizing agents and surfactants is capable of removing long dried paint and thick carbonaceous deposits from used aircraft engines, sometimes without using organic solvents at all and always without using more than a few % of such solvent, thereby greatly reducing pollution potential from this difficult cleaning operation. A preferred cleaner also includes a hydrotroping agent, and the cleaner may also contain corrosion inhibitor, sequestering agent for hard water cations, and other materials.

14 Claims, 1 Drawing Sheet

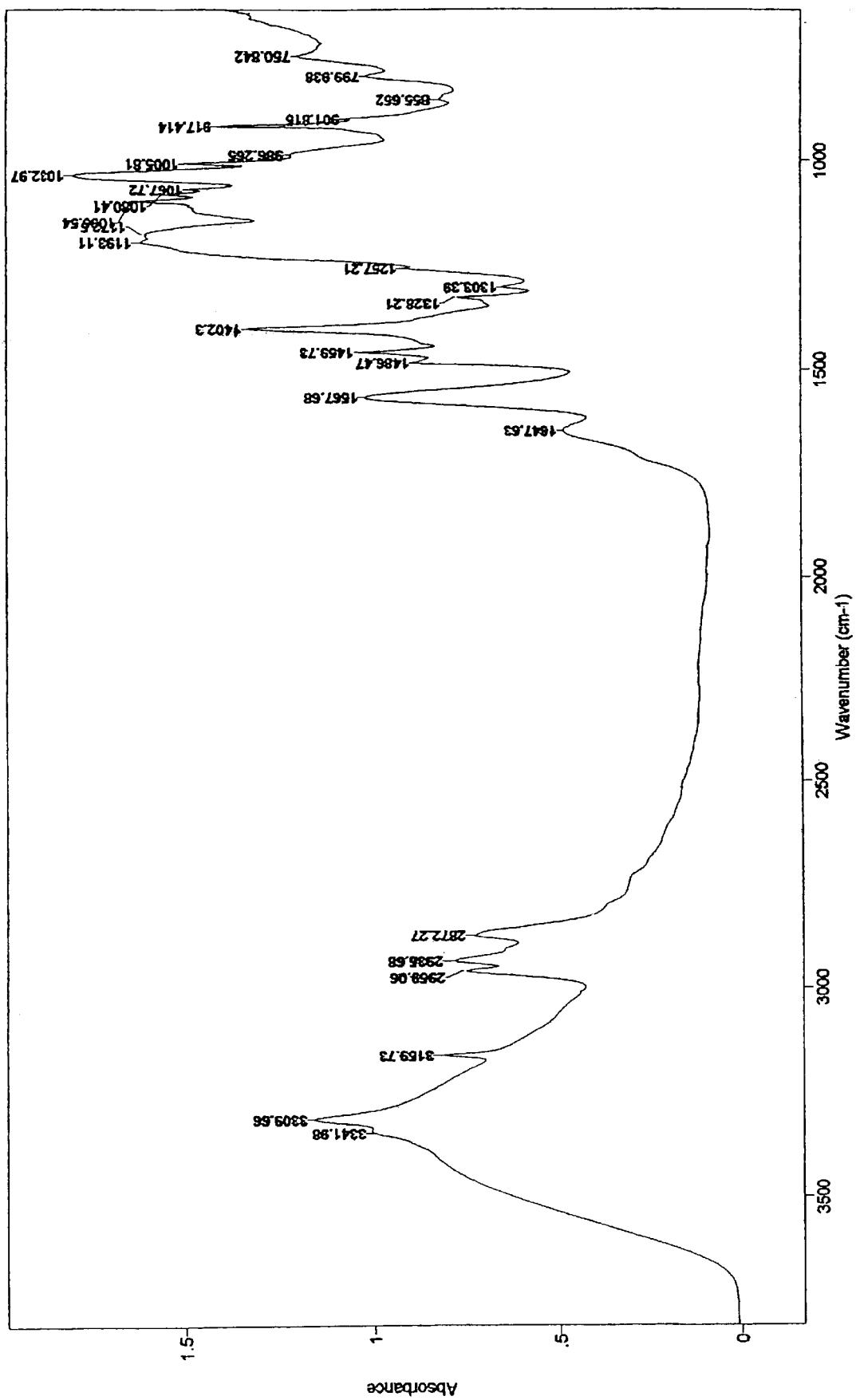

SOLVENT-FREE OR SOLVENT-MINIMIZED PROCESS AND COMPOSITION FOR CLEANING HARD SURFACES, ESPECIALLY FOR REMOVING LONG-DRIED PAINT AND CARBONACEOUS SOILS FROM ALUMINUM ENGINE PARTS

CROSS-REFERENCE TO RELATED APPLICATIONS

Priority is claimed under 35 U.S.C. §119(e) from U.S. Ser. No. 60/163,664 filed Nov. 5, 1999.

STATEMENT REGARDING FEDERALLY SPONSORED RESEARCH OR DEVELOPMENT

Not applicable.

BACKGROUND OF THE INVENTION

The invention relates to cleaning hard surfaces, particularly metal surfaces, more particularly aluminum and aluminum alloy metal surfaces, still more particularly those that have been initially painted because of their use on the exterior of engines and then heavily soiled by organic deposits during use in engines, so that much or all of the surface to be cleaned has been covered with a tightly adhering carbonaceous deposit at least 0.2 millimeters (hereinafter usually abbreviated as "mm") thick and often, over parts of the surface, more than 1 mm thick. In order to produce an optimal result, all of the carbonaceous deposit and any remaining paint must be completely removed, without excessive attack on the metal surface. In some instances, however, it may be satisfactory to remove at least, with increasing preference in the order given, 50, 75, 85, 95, 97, or 99% of the soil and/or paint. Such cleaning by chemical means is believed to have been practical heretofore only with the aid of cleaning liquids that contain substantial concentrations of organic solvents that are legally defined as Volatile Organic Compounds ("VOC's") by the U.S. Clean Air Act and related legislation and regulations. Emissions of VOC's are tightly restricted, so that their use is advantageously omitted or at least reduced as much as possible, consistent with the task to be accomplished. Accordingly, a major object of this invention is to provide a solvent-free, or at least a VOC-free, aqueous liquid process and/or composition, or at least a process and/or composition with a solvent and VOC concentration considerably reduced below currently required levels, that is suitable for cleaning such heavily soiled and usually also painted metal surfaces within a practically useful time. Other alternative and/or concurrent objects are to provide a more economical process, a faster process and/or one requiring less expensive equipment for operation on a large scale, and to reduce hazards of fire and of damage to the environment from discharge of used cleaner. Still other and more detailed objects of the invention will become apparent from the further description below.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight or mass; the term "polymer" includes "oligomer", "copolymer", "terpolymer" and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not preclude unspecified chemical interactions among the constituents of a mixture once mixed; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise such counterions may be freely selected, except for avoiding counterions that act adversely to an object of the invention; the word "mole" means "gram mole", and the word itself and all of its grammatical variations may be used for any chemical species defined by all of the types and numbers of atoms present in it, irrespective of whether the species is ionic, neutral, unstable, hypothetical, or in fact a stable neutral substance with well defined molecules; the term "paint" and all of its grammatical variations include all materials known by more specialized names such as "lacquer", "varnish", "shellac", "primer", "electropaint", "top coat", "color coat", "clear coat", "autodeposited coatings", "radiation curable coatings", "cross-linkable coatings", and the like and their corresponding grammatical variations; and the terms "solution", "soluble", "homogeneous", and the like are to be understood as including not only true equilibrium solutions or homogeneity but also dispersions that show no visually detectable tendency toward phase separation over a period of observation of at least 100, or preferably at least 1000, hours during which the material is mechanically undisturbed and the temperature of the material is maintained within the range of 18–25° C.

The term "aluminum" when used hereafter in this specification, unless the context requires otherwise, is to be understood to include pure aluminum and all the alloys of aluminum that contain at least, with increasing preference in the order given, 45, 55, 75, or 85% of aluminum by weight.

BRIEF SUMMARY OF THE INVENTION

One major embodiment of the invention is a process for cleaning a metal surface that has on it a carbonaceous soil formed by contact of hot gaseous products of combustion of, or of fuel or lubricant materials for, an internal combustion engine with said metal surface and/or with paint originally present on said metal surface before it was brought into contact with said hot products of combustion of, or fuel or lubricant materials for, an internal combustion engine. The process is particularly suited to, but is not limited to, cleaning metal surfaces that have, during their use before cleaning, formed external surfaces of an internal combustion engine. This cleaning process most preferably results in a surface completely cleaned of the carbonaceous soil formed as described above and of any paint originally present on the surface. A process according to the invention includes an operation of contacting the surface to be cleaned with an aqueous liquid cleaning composition that comprises, preferably consists essentially of, or more preferably consists of, water and the following components:

(A) a component of inorganic alkalinizing agents; and
(B) a component of surfactant molecules that are not inorganic alkalinizing agents, at least part of said surfactant molecules being nonionic surfactants; and, optionally, one or more of the following dissolved, stably dispersed, or both dissolved and stably dispersed components:

(C) a component of hydrotroping agent that is not part of any of immediately previously recited components (A) and (B);
(D) a component of corrosion inhibitor that is not part of any of the previously recited components (A) through (C);
(E) a component of sequestering agent that is not part of any of the previously recited components (A) through (D);
(F) a component of coloring agent that is not part of any of the previously recited components (A) through (E);
(G) a component of preservative material that is not part of any of the previously recited components (A) through (F); and
(H) a component of organic solvent that is not more than 20% of the total composition.

In this description, "stably dispersed" means that the component so described can be dispersed by mixing, within 1 hour of its introduction into the liquid phase in which the component in question is described as stably dispersed, to produce a liquid mixture which has only one bulk phase detectable with unaided normal human vision and does not spontaneously develop any separate bulk phase detectable with normal unaided human vision within 24 hours, or preferably, with increasing preference in the order given, within 7, 30, 60, 90,120, 180, 240, 300, or 360 days, of storage without mechanical agitation at 25° C. after being initially mixed. (The word "bulk" in the preceding sentence means that, to be considered as a bulk phase, a phase must occupy at least one volume of space that is sufficiently large to be visible with unaided normal human vision and is separated from at least one other phase present in the dispersion by a boundary surface that can be observed with unaided normal human vision. Therefore, a change of the composition from dear to hazy or from hazy to clear does not indicate instability of a dispersion within this definition, unless a separate liquid or solid phase develops in the mixture in at least one volume large enough to see independently with unaided normal human vision.) Also in this description, "alkali stable" when referring to a surfactant means that the surfactant is capable of coexisting at its critical micelle concentration in an aqueous solution also containing at least, with increasing preference in the order given, 5, 10, 15, 20, 25, or 29% of sodium hydroxide, without any chemical reaction (except possibly for reversible neutralization) between the surfactant and the sodium hydroxide and without the formation of any separate bulk phase detectable with normal unaided human vision within 24 hours, or preferably, with increasing preference in the order given, within 7, 30, 60, 90, 120, 180, 240, 300, or 360 days, of storage without mechanical agitation at 25° C. after being initially mixed. "Organic solvent" as used in defining component (H) above means any organic compound or homogeneous mixture of organic compounds that is a liquid at 25° C. and normal atmospheric pressure.

Process embodiments of the invention may include other process operations, particularly those which are conventional in themselves following cleaning in the prior art. In particular, after the completion of one or more operations of chemical cleaning using a working composition according to this invention as described above, it is very often advantageous to use a spray of water with substantial impingement force, such as is provided by a power washer or spray wand, as a rinse after the chemical treatment. The mechanical action provided by such a rinse is often useful in removing the last traces of soil and/or paint from the surface to be cleaned.

A second major embodiment of the invention is a composition that is particularly advantageously used in a metal cleaning process. The working and concentrate metal cleaning compositions of the invention comprise, preferably consist essentially of, or more preferably consist of, water and the following dissolved, stably dispersed, or both dissolved and stably dispersed components:

(A') a component of inorganic salts of weak acids and strong alkalis, said salts including at least one silicate and at least one phosphate;
(B') a component of alkali stable nonionic surfactant molecules that are not part of immediately previously recited component (A); and
(C') a component of hydrotroping agent molecules that are not part of either of immediately previously recited components (A) and (B); and, optionally, one or more of the following components:
(D') a component of corrosion inhibitors that are not part of any of the previously recited components (A) through (C);
(E') a component of sequestering agents that are not part of any of the previously recited components (A) through (D);
(F') a component of coloring agent that is not part of any of the previously recited components (A) through (E);
(G') a component of preservative material that is not part of any of the previously recited components (A) through (F); and
(H') a component of organic solvent that is not more than 20% of the total composition.

In this description, "stably dispersed", "alkali stable", and "organic solvent" have the same meanings as for the description of the major process embodiment of the invention already described above.

Compositional embodiments of the invention include liquid compositions ready for use as such in cleaning (i.e., "working compositions") and concentrates suitable for preparing working compositions by dilution with water. Concentrates may be single package or multiple, usually dual, package in nature. A multiple package type of concentrate is preferred when not all of the ingredients desired in the working composition are sufficiently soluble or stably dispersible at the higher concentrations required for a one package concentrate composition, which is otherwise preferred. For example, at some concentrations, sometimes preferred polymeric organic sequestering agents and some preferred alkalinizing components can not be jointly solubilized. The two components are then placed in separate packages with other portions of the formulation so that stable solutions or dispersions can be formed after mixing and dilution. A two package concentrate system has some advantages in that the two components can be mixed in different proportions to provide more effective cleaning for particular soils, soil combinations, and/or types of substrate to be cleaned. Ordinarily, however, at least for users for whom cleaning requirements do not vary greatly, single package concentrates are preferred because they are more convenient.

Compositions of the present invention are particularly useful for cleaning in a process according to the invention as described above but are also useful for cleaning any metallic and/or non-metallic hard surfaces such as ceramics and plastics when such surfaces are heavily soiled.

BRIEF DESCRIPTION OF THE DRAWINGS

The sole drawing FIGURE is an infra-red spectrum of SURMAX™ CS-727-MA surfactant (a commercial product of Chemax, Inc.) as used in the Examples herein.

DETAILED DESCRIPTION OF THE INVENTION AND PREFERRED EMBODIMENTS

Component (A) of alkalinizing agent in the cleaning composition used in a process according to this invention as described above preferably is selected from various inorganic salts and hydroxides known to be useful as "inorganic builders" in cleaning formulations generally. Inorganic builders, except for hydroxides, are generally salts of polyfunctional inorganic acids, such as alkali metal silicates, alkali metal borates, alkali metal carbonates, alkali metal sulfates, alkali metal polyphosphates, alkali metal metaphosphates, alkali metal orthophosphates, and alkali metal pyrophosphates. Salts such as sodium silicate, sodium metasilicate, sodium orthosilicate, sodium tetraborate, sodium borate, sodium sulfate, sodium carbonate, trisodium phosphate, disodium orthophosphate, sodium metaphosphate, sodium pyrophosphate, and the equivalent potassium salts and sodium and potassium hydroxides and the like are all suitable alkalinizing agents for compositions according to the present invention. Lithium, rubidium, and cesium salts and hydroxides are also suitable, although usually less preferred because of their higher cost, and ammonium salts are technically suitable but are generally avoided because of the chance of loss by volatilization and the accompanying odor nuisance of ammonia fumes. Silicates are especially preferred, and may constitute the entire alkalinzing component. Sodium metasilicate in particular is most preferred. In a cleaning composition used in a process according to the invention, the pH preferably is, with increasing preference in the order given, not less than 9.5, 10.0, 10.2, 10.4, 10.6, 10.8, 11.0, 11.2, 11.4, 11.6, or 11.8 and independently preferably is, with increasing preference in the order given, not more than 13.0, 12.8, 12.6, 12.4, 12.2, or 12.0. Attainment of a preferred pH value is more important than the concentration of component (A), but as a general guideline this component will constitute at least, with increasing preference in the order given, 0.10, 0.20, 0.30, or 0.40 percent of the total composition and independently preferably does not constitute more than, with increasing preference in the order given, 25, 20, 15, 10, 7, 5, 3, 2.0, or 1.2 percent of the total composition.

The nonionic surfactants required for component (B) of the cleaning composition used in a process according to this invention preferably are selected from the group consisting of: ethoxylated or ethoxylated and propoxylated (nonphenolic) alcohols; ethoxylated and propoxylated carboxylic acids; and ethoxylated or ethoxylated and propoxylated alkyl phenols; all of which can be modified by substituting for the terminal hydrogen atom in the terminal ethoxy or propoxy group a capping moiety that is an alkyl moiety with from 1 to 4 carbon atoms or is a single halo atom, most preferably chloro or fluoro. More preferably, each molecule of component (B) contains at least one, most preferably exactly one, alkyl or alkylaryl moiety that has at least, with increasing preference in the order given, 5, 6, 7, 8, or 9 carbon atoms and independently preferably has not more than, with increasing preference in the order given, 22, 20, 18, 16, 14, 13, or 12 carbon atoms.

Independently of its exact chemical nature, component (B) preferably is present in and/or is mixed to make a cleaning composition used in a process according to the invention so as to have a concentration that is at least, with increasing preference in the order given, 1.0, 2.0, 3.0, 3.5, 4.0, 4.5, 5.0, 5.5, 6.0, 6.5, 7.0, 7.5, 8.0, 8.5, or 8.9 parts of component (B) per thousand total parts of cleaning composition, a concentration unit that may be used hereinafter for any component in any composition and is hereinafter usually abbreviated as "ppt", and independently, at least for economy, preferably is not if, more than, with increasing preference in the order given, 75, 50, 30, 20, 15, 13, 11.0, 10.5, 10.0, 9.5, or 9.0 ppt.

In the absence of any other constituents, preferred amounts and types of components (A) and (B) of a composition used in a process according to this invention as described above may not be soluble in water at the same time, although either of them is readily soluble in the absence of the other. A single phase solution of both components (A) and (B) is then made possible by the presence of optional hydrotroping component (C), which preferably is selected from molecules that are capable of ionizing in aqueous solution to produce a dissolved electrically charged organic moiety. Component (C) is more preferably selected from the group consisting of amine salts of fatty acids, amphoteric surfactants, and partial esters of phosphoric and sulfonic acids and their salts. All of these types of hydrotroping agents have surfactant properties of their own and therefore contribute to the cleaning effectiveness of a composition according to this invention.

The amount of hydrotroping agent in a composition according to this invention preferably has a ratio to the amount of component (B) in the same composition that is at least one of the following numbers: 0.04:1.0, 0.06:1.0, 0.08:1.0, 0.10:1.0, 0.12:1.0, 0.14:1.0, 0.16:1.0, 0.18:1.0, 0.20:1.0, 0.22:1.0, 0.24:1.0, 0.26:1.0, 0.35:1.0, 0.50:1.0, 0.70:1.0, 0.90:1.0, 1.00:1.0, 1.10:1.0, 1.20:1.0, 1.30:1.0, 1.35:1.0, 1.40:1.0, or 1.45:1.0. Higher ratios within this range minimize foaming tendencies, but lower ratios promote more effective cleaning. Accordingly, if foaming is not a problem, at least for economy as the amount of hydrotroping agent in a composition according to this invention preferably has a ratio to the amount of component (B) in the same composition that is not more than, with increasing preference in the order given, 8:1.0, 6:1.0, 4.0:1.0, 3.0:1.0, 2.5:1.0, 2.3:1.0, 2.1:1.0, 1.9:1.0, 1.70:1.0, 1.60:1.0, 1.55:1.0, 1.50:1.0, 1.3:1.0, 1.1:1.0, 0.90:1.0, 0.80:1.0, 0.70:1.0, 0.60:1.0, 0.55:1.0, 0.50:1.0, 0.47:1.0, 0.45:1.0, or 0.43:1.0.

Additional preferences for the cleaning composition used in a process according to the invention are shown below as part of the detailed description of the preferred compositions according to the invention. Any one or more of these preferences independently may be combined with any of the preferences stated above for the cleaning composition used in a process according to the invention to constitute a combination with still greater preference as a cleaning composition used in a process according to the invention.

A surface to be cleaned in a process according to the invention is preferably a metallic, most preferably an aluminum, surface. Independently, but especially when the surface is aluminum, the surface after cleaning preferably does not exhibit any surface pitting, uneven etching, or like surface irregularities of the types often caused by corrosive attack on metal surfaces that is visible, with increasing preference in the order given, with unaided normal human vision or under 2.0, 3.0, 4.0, 5.0, or 10 power magnification. Further and independently, the cleaned surface preferably does not exhibit any rusting, smutting, variation of color, and/or variation of reflectivity that was not characteristic of the hard surface before it was soiled.

Hard surfaces to be cleaned should be contacted with an aqueous cleaning composition of the present invention at a sufficient temperature for a sufficient time to be effective for degreasing. For removing average type soils as encountered in reconditioning used engine parts, the temperature during contact preferably is, with increasing preference in the order given, not less than 39, 48, 54, 59, 63, 66, 69, or 71° C. and independently, primarily for reasons of economy, preferably is, with increasing preference in the order given, not more than 95, 90, 85, 80, 75, or 72° C. Higher temperatures generally provide a more rapid cleaning and can be necessary when the soil comprises high melting point waxy type materials. Under normal conditions in reconditioning engine parts, the time of contact between the metal to be degreased and a working composition according to this invention preferably is, with increasing preference in the order given, not less than 60, 80, 100, 120, or 130 minutes and independently, primarily for reasons of economy, preferably is, with increasing preference in the order given, not more than 250, 220, 190, 170, 160, or 150 minutes. For less recalcitrant soils, substantially shorter times are usually sufficient.

If a time greater than 30 minutes is needed, it is usually advantageous to divide the time between two or more stages or vessels, because any volume of composition according to the invention with which very heavily soiled surfaces are brought into contact dissolves, disperses, or both dissolves and disperses so much soil that it needs to be replaced and/or processed to remove at least some of the thus dissolved, dispersed, or both dissolved and dispersed soil in order for continued use of that particular volume of cleaning composition to be effective. By dividing the total volume of composition according to the invention between two or more different vessels, the required replacement and/or reprocessing volume can be reduced, because a second or third stage cleaner volume will usually dissolve much less soil than the first stage of the same composition according to the invention. Divided volumes have the further advantage that if any solvent is required, it can often be restricted to the last stage, where paint stripping can occur after most other types of soil have been removed.

In a composition according to the invention, component (A') preferably is selected from alkali metal salts of polyfunctional weak inorganic acids, such as alkali metal silicates, alkali metal borates, alkali metal carbonates, alkali metal sulfates, alkali metal polyphosphates, alkali metal phosphates, alkali metal orthophosphates, and alkali metal pyrophosphates. Salts such as sodium silicate, sodium metasilicate, sodium orthosilicate, sodium tetraborate, sodium borate, sodium sulfate, sodium carbonate, trisodium phosphate, disodium orthophosphate, sodium metaphosphate, sodium pyrophosphate, and the equivalent potassium salts and the like are all suitable for component (A') of compositions according to the present invention. Lithium, rubidium, and cesium salts are also suitable, although usually less preferred because of their higher cost, and ammonium salts are technically suitable but are generally avoided because of the chance of loss by volatilization and the accompanying odor nuisance of ammonia fumes.

Component (A) in this preferred composition according to the invention must include silicate and phosphate and more preferably includes all of three distinct subcomponents, (A.1') silicates, (A.2') phosphates, and (A.3') borates that are present in and/or mixed to make the liquid composition. For subcomponent (A.1'), metasilicates are preferred, and, independently of the exact chemical nature of the silicates, their concentration in a working composition according to the invention preferably corresponds stoichiometrically, the stoichiometry being based on equal numbers of silicon atoms, to a concentration of $SiO_2$ in the composition that is at least, with increasing preference in the order given, 0.5, 1.0, 1.5, 2.0, 2.5, 3.0, 3.5, or 3.8 ppt. Independently, primarily for economy, this stoichiometrically equivalent concentration as $SiO_2$ in the composition preferably is not more than, with increasing preference in the order given, 50, 40, 30, 25, 20, 15, 12, 9.0, 8.0, 7.0, 6.0, 5.5, 5.0, 4.5, 4.1, or 3.9 ppt.

The phosphates of subcomponent (A.2') preferably are condensed phosphates in which there are at least two, or more preferably at least three, phosphorus atoms per anion. (This description is to be understood as including the salts known as "metaphosphates", even though their traditional empirical formulas such as $NaPO_3$ indicate only one phosphorus atom per anion; the anions of these materials are now generally regarded as oligomeric cyclic polymers with at least three phosphorus atoms per molecule.) In a working composition according to the invention, the concentration of condensed phosphates preferably is sufficient to have a stoichiometric equivalent as $P_2O_5$, the stoichiometry being based on equal numbers of phosphorus atoms, that is at least, with increasing preference in the order given, 2, 4, 6, 7.0, 7.5, 8.0, 8.5, 9.0, 9.5, 10.0, 10.5, 11.0, or 11.5 ppt and independently preferably is not more than, with increasing preference in the order given, 100, 75, 50, 45, 40, 35, 30, 25, 20, 15, or 12 ppt. Furthermore, independently of the actual concentrations, the ratio of the number of moles of stoichiometric equivalent as $P_2O_5$ supplied by component (A.2') preferably has a ratio to the number of moles of so stoichiometric equivalent as $SiO_2$ supplied by component (A.1') that is at least, with increasing preference in the order given, 0.10:1.00, 0.20:1.00, 0.30:1.00, 0.40:1.00, 0.50:1.00, 0.60:1.00, 0.65:1.00, 0.70:1.00, 0.76:1.00, 0.80:1.00, or 0.85:1.00 and independently preferably is not more than, with increasing preference in the order given, 7:1.00, 5:1.00, 3.0:1.00, 2.0:1.00, 1.7:1.00, 1.4:1.00, 1.1:1.00, or 0.90:1.00.

Still more preferably, subcomponent (A.2') itself comprises, more preferably consists essentially of, or still more preferably consists of, two distinct sub-subcomponents, one provided by metaphosphate salts and the second by tripolyphosphate salts dissolved And in the composition, and the ratio of the stoichiometric equivalent as $P_2O_5$ of the phosphorus present in or supplied to the composition as metaphosphate salts to the stoichiometric equivalent as $P_2O_5$ present in or supplied to the composition as tripolyphosphate salts preferably is at least, with increasing preference in the order given, 0.10:1.00, 0.20:1.00, 0.30:1.00, 0.40:1.00, 0.45:1.00, 0.50:1.00, 0.55:1.00, 0.60:1.00, or 0.63:1.00 and independently preferably is not more than, with increasing preference in the order given, 7:1.00, 5:1.00, 3.0:1.00, 2.5:1.00, 2.0:1.00, 1.5:1.00, 1.0:1.00, 0.90:1.00, 0.80:1.00, 0.75:1.00, 0.70:1.00, or 0.65:1.00.

The borate salts of subcomponent (A.3') preferably are condensed borates, with tetraborates most preferred, and irrespective of their exact chemical nature these salts are preferably present in and/or mixed to make a composition according to the invention in amounts with a stoichiometric equivalent as $B_2O_3$, the stoichiometry being based on equal numbers of boron atoms, that constitutes at least, with increasing preference in the order given, 0.2, 0.4, 0.6, 0.80, 0.85, 0.90, 0.95, 1.00, 1.05, 1.10, 1.15, or 1.20 ppt and independently, at least for economy, preferably constitutes not more than, with increasing preference in the order given, 5.0, 4.0, 3.0, 2.5, 2.2, 1.9, 1.7, 1.5, or 1.3 ppt. Furthermore, independently of the actual concentrations, borate salts are preferably present in and/or mixed to make a composition according to the invention in an amount corresponding to a stoichiometric equivalent as $B_2O_3$ that has a ratio to the stoichiometric equivalent as $SiO_2$ present in and/or mixed to make the same composition that is at least, with increasing preference in the order given, 0.05:1.00, 0.10:1.00, 0.15:1.00, 0.20:1.00, 0.24:1.00, 0.28:1.00, or 0.31:1.00 and independently preferably is not more than, with increasing preference in the order given, 2.5:1.00, 2.0:1.00, 1.5:1.00, 1.0:1.00, 0.80:1.00, 0.70:1.00, 0.65:1.00, 0.60:1.00, 0.55:1.00, 0.50:1.00, 0.45:1.00, 0.40:1.00, or 0.35:1.00.

Any of the salts mentioned above as part of component (A) or (A') may of course be formed in situ in a composition by adding stoichiometrically matched amounts of the acids corresponding to the salts and of an alkali metal hydroxide.

The nonionic surfactants required for component (B') preferably are selected from the group consisting of ethoxylated or ethoxylated and propoxylated (non-phenolic) alcohols, ethoxylated and propoxylated carboxylic acids, and ethoxylated or ethoxylated and propoxylated alkyl phenols, all of which can be modified by capping the terminal ethoxy or propoxy group with a low molecular weight capping moiety generally having 1 to 4 carbon atoms or being a single halo atom, most preferably chloro or fluoro. Among these types of nonionic surfactants, ethoxylated (and not propoxylated) alkyl phenols are most is preferred and, at least for economy, molecules are preferably uncapped. Independently, each molecule of component (B) preferably contains at least one, most preferably exactly one alkyl or alkylaryl hydrophobe moiety (an alkylaryl moiety being considered a single moiety rather than both an alkyl and an aryl moiety) that has at least, with increasing preference in the order given, 5, 6, 7, 8, 9, or 10 carbon atoms and independently preferably has not more than, with increasing preference in the order given, 22, 20, 18, 16, or 15 carbon atoms.

Independently of its exact chemical nature, component (B') preferably is present in and/or is mixed to make a working composition according to the invention with a concentration that is at least, with increasing preference in the order given, 1.0, 2.0, 3.0, 3.5, 4.0, 4.5, 5.0, 5.5, 6.0, 6.5, 7.0, 7.5, 8.0, 8.5, or 8.9 ppt and independently, at least for economy, preferably is not more than, with increasing preference in the order given, 75, 50, 30, 20, 15, 13, 11.0, 10.5, 10.0, 9.5, or 9.0 ppt.

Hydrotroping component (C') in a composition according to the invention preferably is selected from molecules that are capable of ionizing in aqueous solution to produce a dissolved electrically charged organic moiety. Component (C') is more preferably selected from the group consisting of (i) amphoteric surfactants and (ii) partial esters of phosphoric and sulfonic adds and their salts. Alkali Surfactant JEN 2700™, commercially available from Tomah Chemical Products, Milton, Wisconsin and reported by its supplier to be an amphoteric surfactant that is a substituted β-alanine amine derivative with Chemical Abstracts Services Registry # 64972-19-6, and SURMAX™ CS-504, -515, -521, -522, -555, -586, -634, -684, -727, -772, and -786, all commercially available from Chemax, Inc., Greenville, S.C. and reported by their supplier to be amphotericanionic alkali stable surfactants, with other compositional information being proprietary, are examples of suitable amphoteric surfactants. All of these types of hydrotroping agents have surfactant properties themselves and therefore contribute to the cleaning effectiveness of a composition according to this invention.

Still more preferably, component (C') comprises, preferably consists essentially of, or most preferably consists of three distinct types of surfactants: type (C'.1) selected from amphoteric surfactant molecules; type (C'.2) of non-amphoteric anionic surfactant molecules selected from sulfonic acids and salts thereof; and type (C.3) selected from the group consisting of non-amphoteric phosphonic acids and salts thereof.

The amount of hydrotroping agent component (C') in a composition according to this invention preferably has a ratio to the amount of component (B') in the same composition that is at least, with increasing preference in the order given, 0.25:1.0, 0.35:1.0, 0.50:1.0, 0.70:1.0, 0.90:1.0, 1.00:1.0, 1.10:1.0, 1.20:1.0, 1.30:1.0, 1.35:1.0, 1.40:1.0, or 1.45:1.0 and independently, at least for economy, preferably is not more than, with increasing preference in the order given, 8:1.0, 6:1.0, 4.0:1.0, 3.0:1.0, 2.5:1.0, 2.3:1.0, 2.1:1.0, 1.9:1.0, 1.70:1.0, 1.60:1.0, 1.55:1.0, or 1.50:1.0. Higher ratios within this range minimize foaming tendencies, but lower ratios promote more effective cleaning.

Among the optional components, at least component (D') of corrosion inhibitor is normally not needed and is therefore preferably omitted. However, if objectionable stains or other evidence of corrosion are observed on the surfaces being cleaned with a composition according to the invention that does not contain any distinct corrosion inhibitor, any material with a corrosion inhibiting effect on the surface being cleaned may be utilized as optional component (D') according to the invention as described above, provided that it does not compromise any of the major object(s) of the invention.

Optional component (E') is not needed or preferable in most compositions according to the invention, but may be useful in certain cases, particularly if the water that forms the bulk of a composition according to the invention is extraordinarily hard. Any material recognized in the art as a sequestering agent for aluminum, calcium, and/or magnesium cations in aqueous solution may be used. In most instances, however, organic sequestering agents are preferably avoided when aluminum surfaces are to be cleaned, because the organic sequestering agents tend to cause etching that is usually not desired.

Colorants, optional component (F'), serve no known technical purpose in a composition according to the invention, but may be desirable for marketing reasons. Preservatives, optional component (G'), are not generally needed, especially when component (A') includes preferred amounts of borates, but the necessary components of the invention are believed to be capable of nourishing at least some microorganisms, and if growth of micro-organisms on a composition according to the invention causes problems, known preservatives may be added to eliminate the problems if desired.

Organic solvents, optional component (H'), are of course preferably kept to the minimum needed as already noted. Often none of this component will be required, but in some cases when particularly difficult-to-remove dried paint is included as part of the soil that must be removed in a process according to the invention, a composition according to the invention used in such a process may need some of this component in order to achieve satisfactory paint removal within a reasonable time without excessive damage to the metal surface being cleaned. If component (H') is needed, its concentration in a composition according to the invention preferably is not more than, with increasing preference in the order given, 18, 16, 14, 12, 10, 8, 6, 4, 2.0, or 1.0% of the total composition. Independently, when component (H') is present in a composition according to the invention, it is preferably selected from the group consisting of organic compounds that have a boiling point at normal sea level atmospheric pressure that is at least, with increasing preference in the order given, 125, 150, 175, 200, 225, or 240° C. and independently preferably is selected from the group consisting of:

monoethers of glycols, most preferably molecules conforming to the general chemical formula R—$(C_aH_{(2a-2)}O)_b$—$CH(CH_2)_cCH_2OH$, where: R is a monovalent hydrocarbon or halohydrocarbon moiety, having, with increasing preference in the order given, 3, 2, 1, or 0 halogen moieties and having a total number of carbon atoms that is from 2 to 10; a is, with increasing preference in the order given, 4, 3, or 2; b is, with increasing preference in the order given, 3, 2, 1, or 0; c is, with increasing preference in the order given, 2, 1, or 0, the total number of carbon atoms in each molecule of said monoethers of glycols independently preferably being at least, with increasing preference in the order given, 4, 6, or 8 and independently preferably being not more than, with increasing preference in the order given, 20, 18, 16, 14, 12, or 10; and amines, more preferably amines including at least, with increasing preference in the order given, 1, 2, or 3 monovalent moieties conforming to the general chemical formula HO—$C_dH_{(2d-2)}$—, where d is an integer that is not more than, with increasing preference in the order given, 5, 4, 3, or 2.

Still more preferably, if component (H') is present, it contains both monoethers of glycols and amines as described in more detail immediately above in a ratio of glycol monoethers to amines that is at least, with increasing preference in the order given, 0.5:1.00, 1.0:1.00, 1.5:1.00, 2.0:1.00, or 2.4:1.00 and independently preferably is not more than, with increasing preference in the order given, 10:1.00, 8:1.00, 6:1.00, 5.0:1.00, 4.5:1.00, 4.0:1.00, 3.5:1.00, 3.0:1.00, or 2.8:1.00. The single most preferred glycol monoether is phenoxyethanol.

In a working composition according to the invention, the pH preferably is, with increasing preference in the order given, not less than 9.5, 10.0, 10.2, 10.4, 10.6, 10.8, 11.0, 11.2, 11.4, or 11.6 and independently preferably is, with increasing preference in the order given, not more than 13.0, 12.8, 12.6, 12.4, 12.2, 12.0, or 11.8.

A composition of the present invention does not generally require the presence of an additional foam suppressing agent, but use of such a material is within the broad scope of the invention.

For various reasons, almost always including at least a cost saving in avoiding an unnecessary component, it is preferred that compositions according to this invention should contain minimal amounts at most of certain ingredients, including some used in prior art cleaning and degreasing compositions. More particularly, independently for each substance named below, except possibly to the extent that one of the following categories may include a necessary or optional ingredient as described above, a composition according to this invention preferably contains not more than, with increasing preference in the order given, 5, 2.5, 1.25, 0.75, 0.50, 0.25, 0.12, 0.08, 0.04, 0.02, 0.005, 0.002, or 0.0005 ppt of: any phosphate anions with only one phosphorus atom per anion; any cationic surfactants that are not amphoteric; any divalent or higher valent metal cations; organic molecules that contain at least two —OH moieties (which may or may not be part of carboxyl moieties) positioned within the organic molecule in such a way as to be capable of forming a five-membered or larger ring structure in a coordination compound with a metal ion; any organic material that is a liquid at 25° C. and has a boiling point at standard atmospheric pressure that is less than 100° C.; amine oxides; and block copolymers of ethylene and propylene oxides that do not include any hydrophobic group other than one or more poly(propylene oxide) blocks.

In a single package concentrate composition according to the invention, the concentrations of each constituent except water preferably are at least, with increasing preference in the order given, 2.0, 3.0, 4.0, or 5.0 times as great as the values stated above for the same constituent in a working composition according to the invention.

The following examples illustrate the compositions and methods of the present invention. The examples are for illustrative purposes only and are not intended to limit the invention.

Concentrate Composition

A concentrate composition according to the invention was made by mixing with one another the ingredients in the amounts shown in Table 1.

The known chemical characteristics of the ingredients not identified in Table 1 itself or elsewhere herein were as follows: The glassy sodium metaphosphate was reported to have the generic formula $(NaPO_3)_x$. $Na_2O$ and to contain phosphorus in an

TABLE 1

A PREFERRED CONCENTRATE COMPOSITION ACCORDING TO THE INVENTION

| Ingredient | Grams of Ingredient per Kilogram of Concentrate |
|---|---|
| Sodium metasilicate pentahydrate | 68 |
| Sodium tripolyphosphate (anhydrous) | 62 |
| Sodium metaphosphate (glassy) | 34 |
| Sodium tetraborate pentahydrate | 13 |
| TAMOL ™ L surfactant | 19 |
| MIRANOL ™ JS surfactant | 51 |
| TERGITOL ™ NP-10 surfactant | 14 |
| SURMAX ™ CS-727-MA surfactant | 18 |
| CHEMAX ™ CSx-802C surfactant | 9.4 |
| TRITON ™ H-66 surfactant | 42 |
| Water | Balance not otherwise shown above | amount stoichiometrically equivalent to an amount of $P_2O_5$ that is 66 to 68% of the total glassy sodium metasilicate. TAMOL™ L surfactant was supplied by Rohm & Haas and reported to be a 41–44% active solution in water of sodium salts of condensed naphthalene sulfonic acids and also to contain 2 to 5% of sodium sulfate. MIRANOL™ JS surfactant is reported to be a 39–41% active solution in water of CAS Registry No. 68610-39-9, i.e., products of reaction between (i) the sodium salt of 3-chloro-2-hydroxy-1-propanesulfonic add and (ii) 2-heptyl-4,5-dihydro-1H-imidazole-1-ethanol, the principal reaction product being believed to be the sodium salt of {caprylic acid, aminoethylethanolamine amide-imidazoline}. TERGITOL™ NP-10 surfactant is reported to be ethoxylated nonyl phenol with a hydrophile-lipophile-balance ("HLB") value of 13.6. SURMAX™ CS-727 is reported to be a 50% active aqueous solution; its detailed chemical composition is proprietary, but it has been found to contain sulfur in an amount stoichiometrically equivalent to 10.8% $SO_4^{-2}$, phosphorus in an amount stoichiometrically equivalent to 1.3% $PO_4^{-3}$; it also has an infrared spectrum, after drying, as shown in the sole drawing is figure, which is believed to indicate the presence of alkyl sulfonate moieties, alkyl amide moieties, phosphate ester moieties, and ether moieties in it. (This infrared spectrum was obtained by an attenuated total reflectance technique, using a Fourier transform spectrometer with a laser wave number of 15,000.80 reciprocal centimeters, a resolution of 4 reciprocal centimeters, and a scanning velocity of 5 kilohertz on a sample of the surfactant as supplied that had been dried at about 100° C. in an oven to remove its water content). CHEMAX™ CSX-802C surfactant is reported to be a 71% active solution in water of ethoxylated nonylphenol. TRITON™ H-66 surfactant is reported by its supplier to be a 49% active solution in water of potassium salts of alkylaryl ethoxy partial esters of phosphoric acid.

Working Composition and Process Examples

Working compositions as shown in Table 2 below are made from the concentrate described immediately above.

TABLE 2

WORKING COMPOSITIONS MADE FROM THE CONCENTRATE DESCRIBED IN TABLE 1

| Ingredient | % of Ingredient in Working Composition Number: | | | |
|---|---|---|---|---|
| | W1 | W2 | W3 | W4 |
| Concentrate from Table 1 | 10 | 20 | 20 | 25 |
| Phenoxy ethanol ("Phenyl Cellosolve ™") | None | None | 7.3 | 7.3 |
| Triethanol amine | None | None | 2.7 | 2.7 |

Various heavily soiled parts from exteriors of used aluminum engines are cleaned using these working compositions. These parts had hard, nearly black, deposits derived from the fuel and/or lubricants used in the engines and/or their hot gaseous combustion products, over most of their outer surface, in some instances as much as several millimeters thick. Most of the parts had originally been painted, and at least part of the paint remained underneath the deposits. Cleaning is performed in a four stage process, in which the first three stages are immersion for 45 minutes each in three successive cleaning vessels. After passing through these first three stages, the substrates are washed with a spray wand supplying pressurized hot water. Depending on the extent of soiling and the thickness of the initial paint, the first and second stage cleaning vessels contain Composition W1 or W2 and the third cleaning vessel contains W1, W2, W3, or W4, and these compositions are maintained at a temperature within the range from 71 to 82° C. Complete removal of soil and paint is achieved with no visible corrosive attack on or smutting of the aluminum surface.

Additional Process Examples

For these examples, cleaning compositions are made with the ingredients shown in Table 3 below.

TABLE 3

ADDITIONAL WORKING COMPOSITIONS FOR PROCESSES ACCORDING TO THE INVENTION

| Ingredient | Grams of Ingredient per Liter of Working Composition for Composition Number: | | | |
|---|---|---|---|---|
| | 3.1 | 3.2 | 3.3 | 3.4 |
| Sodium metasilicate pentahydrate | None | None | 16.0 | 16.0 |
| Sodium tripolyphosphate (anhydrous) | 16.6 | 16.6 | None | None |
| Sodium metaphosphate (glassy) | 9.1 | 9.1 | None | None |
| Sodium tetraborate pentahydrate | 3.4 | 3.4 | None | None |
| Boric acid, technical grade, granular | None | None | 1.24 | 1.24 |
| Sorbitol, 70% solution in water | 3.2 | 3.2 | None | None |
| TAMOL ™ L surfactant | 5.0 | 5.0 | None | None |
| MIRANOL ™ JS surfactant | 13.7 | 13.7 | None | None |
| TERGITOL ™ NP-10 surfactant | 10.3 | 10.3 | None | None |
| SURMAX ™ CS-727 surfactant | 4.8 | 4.8 | None | None |
| CHEMAX ™ CSx-802C surfactant | 2.5 | 2.5 | None | None |
| TRITON ™ H-66 surfactant | 6.8 | 6.8 | None | None |
| CHEMAX ™ LA-9 surfactant | None | None | 21 | 21 |
| SURMAX ™ CS-684 | None | None | 6.4 | 6.4 |
| Alkali Surfactant JEN 2700 ™ | None | None | 17.6 | 17.6 |
| N-octyl-2-pyrrolidone | None | None | 2.1 | 2.1 |
| Phenoxy ethanol | None | 7.3 | None | 7.3 |
| Triethanol amine | None | 2.7 | None | 2.7 |
| Water | Balance not otherwise shown above | | | |

The working compositions described in Table 3 are used in the process sequences shown in detail below to clean heavily soiled used engine parts of the same type as described above.

Process Operations Sequence 1

1.1. Immerse part in a first volume of Composition 3.1 maintained at 82° C. for 45 min, then remove.
1.2. Immerse part in a second volume of Composition 3.1 maintained at 82° C. for 45 min, then remove.
1.3. Immerse part in a third volume of Composition 3.1 maintained at 82° C. for 45 min, then remove.
1.4. Power wash with ambient temperature water for 1 to 2 min. All soil and paint is removed.

Process Operations Sequence 2

2.1. Immerse part in a first volume of Composition 3.1 maintained at 82° C. for 45 min, then remove.
2.2. Immerse part in a second volume of Composition 3.1 maintained at 82° C. for 45 min, then remove.
2.3. Immerse part in a volume of Composition 3.2 maintained at 82° C. for 45 min, then remove.
2.4. Power wash with ambient temperature water for 1 to 2 min. More than 95% of the paint and at least 99% of all other soil is removed.

Process Operations Sequence 3

3.1. Immerse part in a first volume of Composition 3.3 maintained at 77° C. for 45 min, then remove.
3.2. Power wash with ambient temperature water for 1 to 2 min.
3.3. Immerse part in a second volume of Composition 3.3 maintained at 77° C. for 45 min, then remove.
3.4. Power wash with ambient temperature water for 1 to 2 min.
3.5. Immerse part in a volume of Composition 3.3 maintained at 77° C. for 45 min, then remove.
3.6. Power wash with ambient temperature water for 1 to 2 min. More than 75% of the paint and at least 97% of all other soil is removed.

Process Operations Sequence 4

4.1. Immerse part in a first volume of Composition 3.3 maintained at 77° C. for 45 min, then remove.

4.2. Power wash with ambient temperature water for 1 to 2 min.

4.3. Immerse part in a second volume of Composition 3.3 maintained at 77° C. for 45 min, then remove.

4.4. Power wash with ambient temperature water for 1 to 2 min.

4.5. Immerse part in a volume of Composition 3.4 maintained at 77° C. for 45 min, then remove.

4.6. Power wash with ambient temperature water for 1 to 2 min. More than 98% of the paint and of all other soil is removed.

The invention claimed is:

1. A process for removing from a metal surface:
at least 50% of an adherent carbonaceous deposit that is at least 0.2 mm thick and has been formed on at least one of:
   said metal surface; and
   paint that is in contact on one side with said metal surface by contact between:
   at least one of said metal surface and said paint and at least one of:
      hot gaseous products of combustion emitted from an internal combustion engine; and
      fuel for, lubricating materials for, or both fuel and lubricating materials for, an internal combustion engine; and
any paint that is in contact with said metal surface at the beginning of said process, said process comprising at least one operation of contacting at least one of said metal surface, said paint in contact with said metal surface at the beginning of the process, and said carbonaceous deposit with an aqueous liquid cleaning composition that comprises water and the following components:
(A) a component of inorganic alkalinizing agent selected from the group consisting of hydroxides, salts of polyfunctional inorganic acids, and mixtures thereof; and
(B) a component of surfactant molecules that are not inorganic alkalinizing agents, at least part of said surfactant molecules being nonionic surfactants;
and does not comprise more than about 6% of organic solvent, said operation of contacting being continued for an interval of time and then discontinued and, optionally, being followed by an operation of rinsing said metal surface with pressurized water.

2. A process according to claim 1, wherein:
the aqueous liquid cleaning composition has a pH value within a range from about 9.5 to about 13.0;
component (A) comprises silicate and constitutes from about 0.2 to about 20 percent of the total aqueous liquid cleaning composition;
component (B) constitutes from about 1.0 to about 20 ppt of the total aqueous liquid composition;
the nonionic surfactant molecules of component (B) are selected from the group consisting of:
   ethoxylated and, optionally, also propoxylated alkyl phenols;
   ethoxylated, propoxylated, and both ethoxylated and propoxylated carboxylic acids; and
   ethoxylated and, optionally, also propoxylated (nonphenolic) alcohols, all of which can be modified by substituting for the terminal hydrogen atom in the terminal ethoxy or propoxy group a capping moiety that is an alkyl moiety with from 1 to 4 carbon atoms or is a single halo atom.

3. A process according to claim 2, wherein the aqueous liquid cleaning composition additionally comprises a component (C) of hydrotroping agent selected from the group consisting of amine salts of fatty acids, amphoteric surfactants, and partial esters of phosphoric and sulfonic acids and their salts, the amount of said hydrotroping agent in said aqueous liquid cleaning composition having a ratio to the amount of component (B) in said aqueous liquid cleaning composition that is at least about 0.35:1.0.

4. A process according to claim 3, wherein:
component (A) comprises at least:
   subcomponent (A.1) of silicate in an amount that has a stoichiometric equivalent as silica that corresponds to a concentration of silica in the aqueous liquid cleaning composition that is from about 1.0 to about 20 ppt of the total aqueous liquid cleaning composition; and
   subcomponent (A.2) of condensed phosphates in an amount that has a stoichiometric equivalent as diphosphorus pentoxide, the stoichiometry being based on equivalent numbers of phosphorus atoms, that corresponds to a concentration of diphosphorus pentoxide in the aqueous liquid cleaning composition that is from about 4 to about 40 ppt of diphosphorus pentoxide;
component (B) constitutes from about 4.0 to about 20 ppt of the total aqueous liquid composition;
the nonionic surfactant molecules of component (B) are selected from the group consisting of:
   ethoxylated and, optionally, also propoxylated alkyl phenols;
   ethoxylated, propoxylated, and both ethoxylated and propoxylated carboxylic acids; and
   ethoxylated and, optionally, also propoxylated (nonphenolic) alcohols, all of which can be modified by substituting for the terminal hydrogen atom in the terminal ethoxy or propoxy group a capping moiety that is an alkyl moiety with from 1 to 4 carbon atoms or is a single halo atom;
the aqueous liquid cleaning composition additionally comprises a component (C) of hydrotroping agent selected from the group consisting of amine salts of fatty acids, amphoteric surfactants, and partial esters of phosphoric and sulfonic acids and their salts, the amount of said hydrotroping agent in said aqueous liquid cleaning composition having a ratio to the amount of component (B) in said aqueous liquid cleaning composition that is from about 0.70:1.0 to about 2.1:1.00.

5. A process according to claim 4, wherein:
component (A) additionally comprises a subcomponent (A.3) of condensed borate salts in an amount that has a stoichiometric equivalent as diboron trioxide, the stoichiometry being based on equivalent numbers of boron atoms, that corresponds to a concentration of diboron trioxide in the aqueous liquid cleaning composition that is from about 4 to about 40 ppt of diboron trioxide;
subcomponent (A.3) has a stoichiometric equivalent as diboron trioxide that has a molar ratio to the stoichiometric equivalent of subcomponent (A.1) as silica that is from about 0.15:1.00 to about 0.60:1.00;
subcomponent (A.2) has a stoichiometric equivalent as diphosphorus pentoxide that has a molar ratio to the stoichiometric equivalent of subcomponent (A.1) as silica that is from about 0.40:1.00 to about 2.0:1.00;
each molecule of component (B) contains at least one alkylaryl hydrophobe moiety that has from about 8 to about 16 carbon atoms;

subcomponent (A.1) is present in an amount that has a stoichiometric equivalent as silica that corresponds to a concentration of silica in the aqueous liquid cleaning composition that is from about 2.5 to about 7.0 ppt of the total aqueous liquid cleaning composition;

subcomponent (A.2) of condensed phosphates is present in an amount that has a stoichiometric equivalent as diphosphorus pentoxide, the stoichiometry being based on equivalent numbers of phosphorus atoms, that corresponds to a concentration of diphosphorus pentoxide in the aqueous liquid cleaning composition that is from about 8.0 to about 25 ppt of diphosphorus pentoxide; and component (B) constitutes from about 5.5 to about 15 ppt of the total aqueous liquid composition.

6. A process for removing from a metal surface:

at least 50% of an adherent carbonaceous deposit that is at least 0.2 mm thick and has been formed on at least one of:
   said metal surface; and
   paint that is in contact on one side with said metal surface by contact between:
      at least one of said metal surface and said paint and at least one of:
         hot gaseous products of combustion emitted from an internal combustion engine; and
         fuel for, lubricating materials for, or both fuel and lubricating materials for, an internal combustion engine; and any paint that is in contact with said metal surface at the beginning of said process, said process comprising at least one operation of contacting at least one of said metal surface, said paint in contact with said metal surface at the beginning of the process, and said carbonaceous deposit with an aqueous liquid cleaning composition that has been made by mixing with a first mass of water at least the following masses of the following substances:
   (A) a second mass of inorganic alkalinizing agent selected from the group consisting of hydroxides, salts of polyfunctional inorganic acids, and mixtures thereof; and
   (B) a third mass of surfactant molecules that are not inorganic alkalinizing agents, at least part of said surfactant molecules being nonionic surfactants,
said aqueous liquid cleaning composition not comprising more than about 6% of organic solvent, said operation of contacting being continued for an interval of time and then discontinued and, optionally, being followed by an operation of rinsing said metal surface with pressurized water.

7. A process according to claim 6, wherein:

the aqueous liquid cleaning composition has a pH value within a range from about 9.5 to about 13.0;

said second mass comprises silicate and constitutes from about 0.2 to about 20 percent of the total aqueous liquid cleaning composition;

said third mass constitutes from about 1.0 to about 20 ppt of the total aqueous liquid composition;

the nonionic surfactant molecules of said third mass are selected from the group consisting of:
   ethoxylated and, optionally, also propoxylated alkyl phenols;
   ethoxylated, propoxylated, and both ethoxylated and propoxylated carboxylic acids; and
   ethoxylated and, optionally, also propoxylated (non-phenolic) alcohols, all of which can be modified by substituting for the terminal hydrogen atom in the terminal ethoxy or propoxy group a capping moiety that is an alkyl moiety with from 1 to 4 carbon atoms or is a single halo atom.

8. A process according to claim 7, wherein the aqueous liquid cleaning composition additionally comprises (C) a fourth mass of hydrotroping agent selected from the group consisting of amine salts of fatty acids, amphoteric surfactants, and partial esters of phosphoric and sulfonic acids and their salts, the amount of said fourth mass mixed to make said aqueous liquid cleaning composition having a ratio to the amount of said third mass (B) mixed to make said aqueous liquid cleaning composition that is at least about 0.35:1.0.

9. A process according to claim 8, wherein:

said second mass comprises at least:
   (A.1) a first submass of silicate in an amount that has a stoichiometric equivalent as silica that corresponds to a concentration of silica in the aqueous liquid cleaning composition that is from about 1.0 to about 20 ppt of the total aqueous liquid cleaning composition; and
   (A.2) a second submass of condensed phosphates in an amount that has a stoichiometric equivalent as diphosphorus pentoxide, the stoichiometry being based on equivalent numbers of phosphorus atoms, that corresponds to a concentration of diphosphorus pentoxide in the aqueous liquid cleaning composition that is from about 4 to about 40 ppt of diphosphorus pentoxide;

said third mass constitutes from about 4.0 to about 20 ppt of the total aqueous liquid composition;

the nonionic surfactant molecules of said third mass are selected from the group consisting of:
   ethoxylated and, optionally, also propoxylated alkyl phenols;
   ethoxylated, propoxylated, and both ethoxylated and propoxylated carboxylic acids; and
   ethoxylated and, optionally, also propoxylated (non-phenolic) alcohols, all of which can be modified by substituting for the terminal hydrogen atom in the terminal ethoxy or propoxy group a capping moiety that is an alkyl moiety with from 1 to 4 carbon atoms or is a single halo atom;

there has additionally been mixed to make the aqueous liquid cleaning composition a fourth mass of hydrotroping agent selected from the group consisting of amine salts of fatty acids, amphoteric surfactants, and partial esters of phosphoric and sulfonic acids and their salts, the amount of said fourth mass having a ratio to the amount of said second mass mixed to make said aqueous liquid cleaning composition that is from about 0.70:1.0 to about 2.1:1.00.

10. A process according to claim 9, wherein:

said second mass additionally comprises a third submass (A.3) of condensed borate salts in an amount that has a stoichiometric equivalent as diboron trioxide, the stoichiometry being based on equivalent numbers of boron atoms, that corresponds to a concentration of diboron trioxide in the aqueous liquid cleaning composition that is from about 4 to about 40 ppt of diboron trioxide;

said third submass has a stoichiometric equivalent as diboron trioxide that has a molar ratio to the stoichiometric equivalent of said first submass as silica that is from about 0.15:1.00 to about 0.60:1.00;

said second submass has a stoichiometric equivalent as diphosphorus pentoxide that has a molar ratio to the stoichiometric equivalent of said first submass as silica that is from about 0.40:1.00 to about 2.0:1.00;

each molecule of said third mass contains at least one alkylaryl hydrophobe moiety that has from about 8 to about 16 carbon atoms;

said first submass has a stoichiometric equivalent as silica that corresponds to a concentration of silica in the aqueous liquid cleaning composition that is from about 2.5 to about 7.0 ppt of the total aqueous liquid cleaning composition;

said second submass of condensed phosphates has a stoichiometric equivalent as diphosphorus pentoxide, the stoichiometry being based on equivalent numbers of phosphorus atoms, that corresponds to a concentration of diphosphorus pentoxide in the aqueous liquid cleaning composition that is from about 8.0 to about 25 ppt of diphosphorus pentoxide; and said third mass constitutes from about 5.5 to about 15 ppt of the total mass of the aqueous liquid composition.

11. A process according to claim 10, wherein said aqueous liquid cleaning composition is maintained at a temperature that is not more than about 85° C. during its contact with the substrate being cleaned and the time of contact is not more than about 190 minutes.

12. A process according to claim 6, wherein said aqueous liquid cleaning composition is maintained at a temperature that is not more than about 85° C. during its contact with the substrate being cleaned and the time of contact is not more than about 190 minutes.

13. A process according to claim 5, wherein said aqueous liquid cleaning composition is maintained at a temperature that is not more than about 85° C. during its contact with the substrate being cleaned and the time of contact is not more than about 190 minutes.

14. A process according to claim 1, wherein said aqueous liquid cleaning composition is maintained at a temperature that is not more than about 85° C. during its contact with the substrate being cleaned and the time of contact is not more than about 190 minutes.

* * * * *